Oct. 15, 1940.   A. BAER   2,217,853
SEAL FOR ROTARY VALVES IN INTERNAL COMBUSTION ENGINES
Filed Sept. 19, 1939   2 Sheets-Sheet 1

Inventor:
A. Baer
By: Glascock Downing & Seebold
Attys.

Oct. 15, 1940.   A. BAER   2,217,853
SEAL FOR ROTARY VALVES IN INTERNAL COMBUSTION ENGINES
Filed Sept. 19, 1939   2 Sheets-Sheet 2

Inventor:
A. Baer

Patented Oct. 15, 1940

2,217,853

UNITED STATES PATENT OFFICE 2,217,853

SEAL FOR ROTARY VALVES IN INTERNAL COMBUSTION ENGINES

Alfred Baer, Berlin-Schmargendorf, Germany

Application September 19, 1939, Serial No. 295,665
In Germany September 9, 1938

2 Claims. (Cl. 123—190)

My invention relates to seals for rotary valves in internal combustion engines by which the combustion chamber is sealed against the valve.

It is important that such seals will not warp since warping may deteriorate the seal to such an extent that the use of a rotary valve is economical no longer. On the other hand the seal has a tendency to warp since that portion which faces the combustion chamber and is heated by the combustion products, obviously becomes much hotter than that portion which engages the cooled rotary valve. The internal stresses produced by the temperature cause warping of the seal and, unless provision is made for preventing warping, the seal cannot perform its function.

There is a great variety of seals, and it has also been proposed already to make them of two or more parts. However, it was found that subdividing the seal does not eliminate warping to the extent required but that its parts must be so arranged that they can expand freely and without interfering with each other. In other words, internal stresses produced by heat in one of the parts must not exert a detrimental action on any other part, or parts, of the seal. This condition of non-interference is not fulfilled when the individual parts of the seal are annular and connected by threads, or nested in each other in the shape of frames, as is usual in seals as designed heretofore, since this prevents free expansion.

On the other hand, the said condition is fulfilled according to the invention by connecting the parts of the seal only at small areas, and by so configurating the parts that they are free to move in one direction. Such movement is obviously only small, but for obtaining reliability and long life in the seal, the said freedom of its parts in a given direction is indispensable.

Various means may be provided for connecting the parts so that the said movement is permitted and interference of the parts is prevented. Suitable means are, for instance, screws, rivets, cylindrical or taper pins, dovetails, spot welding or spot soldering. By providing these, or any other, suitable small connecting means, and by suitable configurating the individual parts, the occurrence of any alterations in parts which are adjacent to, and connected with, a given part, as a consequence of the thermal expansion and contraction of this given part, and therewith warping, is practically eliminated.

In the accompanying drawings, various seals embodying my invention are illustrated by way of example.

In the drawings

Figs. 1 to 3, inclusive, illustrate a seal whose parts are connected by screws.

Figure 1:
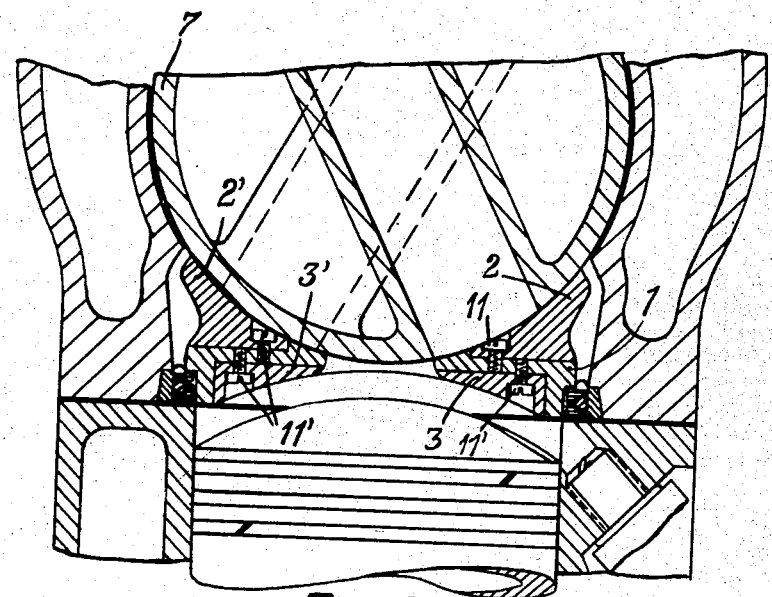
Fig. 1 is an axial section of a cylinder head equipped with a rotary valve, and with my novel seal for protecting the valve against the heat of combustion.
Figure 2:
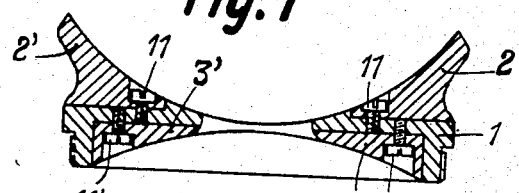
Fig. 2 is a separate illustration of the seal, in section on the axis of the cylinder.
Figure 3:
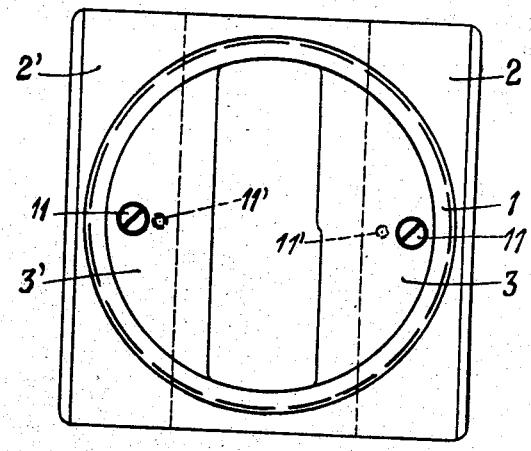
Fig. 3 is a plan view of the seal, viewed from below.
Figure 4:
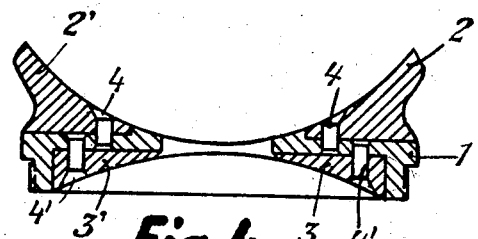
Figure 5:
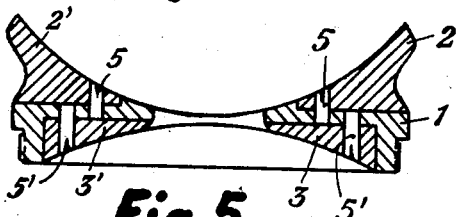
Figure 6:
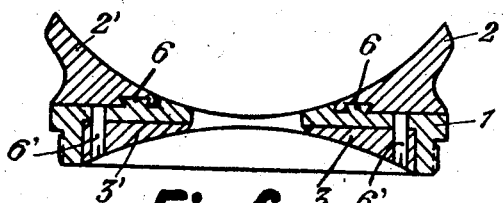
Figure 7:
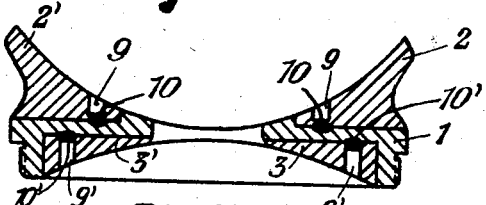
Figure 8:
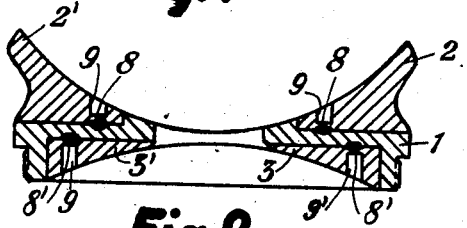

Figs. 4 to 8 illustrate the seal in section, as in Fig. 2, but equipped with the following connecting means instead of the screws illustrated in Figs. 1 to 3: Fig. 4: rivets; Fig. 5: taper pins; Fig. 6: a combination of cylindrical pins and dovetails; Fig. 7: spot welding; Fig. 8: spot soldering.

Similar reference numerals denote similar parts in the different figures.

Referring now to the drawings in greater detail, and first to Figs. 1, 2 and 3, the piston head, part of the cylinder, and part of the cylinder head have been illustrated but these parts will not be described as they have no bearing on my invention.

The seal is built up from three parts: an annulus or ring 1 which may be of cast iron or steel and in its interior presents a pair of sealing faces to the rotary valve 7 in the cylinder head. Similar faces are presented by a pair of sectors 2 and 2' which are placed on the upper side of the annulus 1 and secured by two screws 11. Flame shields 3 and 3' are secured to the lower face of the annulus 1 by screws 11'.

It will appear that with this arrangement of the three seal parts, the sealing faces on the annulus 1, and the shield 3 and 3', are free to expand toward the axis of the cylinder, and the sectors 2 and 2' are free to expand away from the axis.

In Fig. 4, the screws 11 and 11' in Figs. 1 to 3 are replaced by rivets 4 and 4'.

In Fig. 5, taper pins 5 and 5' are provided.

In Fig. 6, the annulus 1 has a pair of dovetailed ribs 6 on which the sectors 2 are placed with dovetailed grooves, and parallel pins 6' hold the shields 3 on the annulus.

In Fig. 7, the sectors 2 and 2' are connected to the annulus 1 by spot welds 10, and the shields 3 and 3' are connected to the annulus by spot welds 10'. One of the welding electrodes is introduced from one side of each weld through a hole 9 or 9', and the other electrode is placed against the opposite side of the annulus.

In Fig. 8, the spot welds shown in Fig. 7 are replaced by lumps of suitable material 8 and 8' which are melted or welded to connect the parts.

It is understood that I am not limited to any of the connecting means, or combination of connecting means, which have been illustrated by way of example.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. A seal for rotary valves in internal combustion engines comprising a plurality of parts, and fastening means connecting the parts so that each part is free to expand in one direction independently of the other parts.

2. A seal for rotary valves in internal combustion engines comprising an annulus presenting sealing faces to the rotary valve, sectors arranged on the annulus to form the continuation of such faces at opposite sides thereof, flame shields arranged at that side of the annulus which is opposite the sealing faces and the sectors, and means for so connecting the annulus, the sectors, and the shields, that each part is free to expand in one direction independently of the other parts.

ALFRED BAER.